United States Patent [19]
Goo et al.

[11] Patent Number: 5,694,626
[45] Date of Patent: Dec. 2, 1997

[54] CAMERA FLASH CONTROL DEVICE AND METHOD THEREOF FOR PREVENTING RED-EYE PHENOMENON

[75] Inventors: Bon-Jeong Goo; Cha-Woon Choo, both of Kyeongsangnam-do, Rep. of Korea

[73] Assignee: Samsung Aerospace Industries, Ltd., Kyeongsangnam-do, Rep. of Korea

[21] Appl. No.: 774,333

[22] Filed: Dec. 27, 1996

[30] Foreign Application Priority Data

Dec. 28, 1995 [KR] Rep. of Korea .................... 95-61843

[51] Int. Cl.$^6$ ............................................. G03B 15/03
[52] U.S. Cl. ................................................... 396/158
[58] Field of Search ....................................... 396/158

[56] References Cited

U.S. PATENT DOCUMENTS 5,159,379  10/1992  Shirane et al. ...................... 396/158
5,231,446   7/1993  Ohtsuka ............................... 396/158
5,264,894  11/1993  Kobayashi et al. .................. 396/158
5,285,232   2/1994  Taniguchi et al. ................... 396/158

FOREIGN PATENT DOCUMENTS 91-19756  11/1991  Rep. of Korea .

*Primary Examiner*—Russell E. Adams
*Attorney, Agent, or Firm*—Finnegan, Henderson, Farabow, Garrett & Dunner, L.L.P.

[57] ABSTRACT

A camera flash control device and method thereof for preventing red-eye phenomenon which can prevent red-eye phenomenon by controlling the amount of light and a number of times the light is emitted from a flash according to a distance measured from an object to a camera with a built-in flash. The camera flash control device comprises a first photographic mode selector, an automatic distance measuring circuit, a zoom position sensor, a second photographic mode selector, a micro-controller and a flash.

15 Claims, 3 Drawing Sheets

CAMERA FLASH CONTROL DEVICE AND METHOD THEREOF FOR PREVENTING RED-EYE PHENOMENON

BACKGROUND OF THE INVENTION

A. Field of the Invention

The present invention relates to a camera flash control device and method thereof for preventing red-eye phenomenon. More particularly, the present invention relates to a camera flash control device and method thereof for preventing red-eye phenomenon which can prevent red-eye phenomenon by controlling the amount of light and a number of times the light is emitted from a flash according to a distance from an object to a camera with a built-in flash.

B. Description of the Prior Art

Generally, photograph quality is prevented from being deteriorated, by voluntarily lighting a flash, for a quite short time, which is very similar to sun's ray having a large quantity of light and high color temperature when a photograph is taken at a dark room or at night since the photograph quality is greatly influenced by ambient brightness.

A flash should be mounted in a camera to perform the above-mentioned operation, and the instantaneous flash is generated when the flash is operated concurrently with the pressing of a shutter button.

Accordingly, a xenon discharge tube is employed to make the flash, and this xenon discharge tube requires power of high voltage. On the other hand, a light dry battery should be used for supplying power since the camera is commonly portable. Generally, a transformer is used for this. That is, the dry battery, the transformer and the xenon discharge tube are elementary in construction of the flash, and properly used with the various modifications according to a design.

The above-mentioned flash is operated to generate a predetermined amount of flash concurrently with the pressing of the shutter button.

Korean Patent Application No. 92-19756, filed on Nov. 7, 1991 and entitled "STROBO FLASH CIRCUIT" has disclosed a technique to overcome the red-eye phenomenon in which eyes of an object turns red when taking a photograph.

However, the conventional device still has a disadvantage in that the eyes of the object becomes red since the sufficient amount of light does not reach the object when the object to be photographed is distant since only a predetermined amount of light is pre-emitted to the object at a time regardless of the distance from the object.

SUMMARY OF THE INVENTION

Accordingly, the object of the present invention is to provide a camera flash control device and method thereof for preventing red-eye phenomenon which can prevent red-eye phenomenon by controlling the amount of light and a number of times the light is emitted from a flash according to a distance measured from an object to a camera with a built-in flash to substantially obviate one or more of the problems due to limitations and disadvantages of the prior art.

To achieve the object and in accordance with the purpose of the invention, the camera control device for preventing red-eye phenomenon comprises:

first photographic mode selecting means for selecting a red-eye phenomenon prevention emitting mode;

automatic distance measuring means for measuring a distance from an object;

zoom position sensing means for sensing a present zoom position of lenses;

second photographic mode selecting means for selecting a red-eye phenomenon prevention photographic mode;

control means for controlling a pre-emitting operation by outputting a flash driving signal according to a first set amount when the distance from the object is long and outputting a flash driving signal according to a second set amount when the distance from the object is short after determining whether the distance from the object measured according to the present zoom position of the lenses is long or short when the red-eye phenomenon prevention photographic mode is selected; and emitting means driven according to the flash driving signal outputted from the control means and for emitting a predetermined amount of light.

According to another aspect of the present invention, a method for preventing red-eye phenomenon comprises the steps of:

sensing a present zoom position of lenses when a red-eye phenomenon prevention photographic mode is selected;

measuring a distance from an object and determining whether the measured distance from the object according to the sensed zoom position is long or short;

emitting a predetermined amount of light by driving an emitting means according to a first set amount when the measured distance from the object is long; and emitting a predetermined amount of light by driving the emitting means according to a second set amount when the measured distance from the object is short.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate an embodiment of the invention and, together with the description, serve to explain the principle of the invention.

DESCRIPTION OF THE PREFERRED EMBODIMENT

Reference will now be made in detail to a preferred embodiment of the present invention, an example of which is illustrated in the accompanying drawings.

Figure 1:
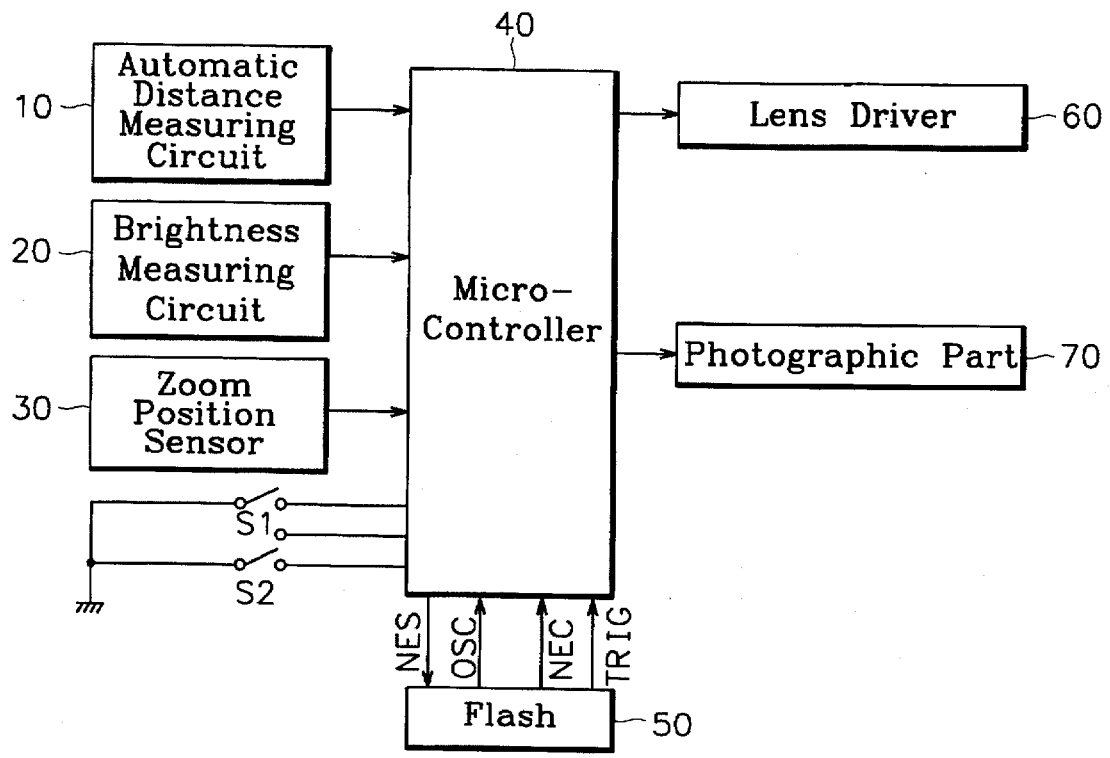
FIG. 1 is a block diagram of a camera flash control device for preventing red-eye phenomenon in accordance with a preferred embodiment of the present invention.

Referring to FIG. 1, a camera flash control device for preventing red-eye phenomenon in accordance with the preferred embodiment of the present invention includes:

a release switch S1 of which operation state is changed from a first step to a second step;

a photographic mode switch S2 for selecting a red-eye phenomenon prevention photographic mode and the other photographic mode;

an automatic distance measuring circuit 10 for measuring a distance from an object;

a brightness measuring circuit 20 for measuring an ambient brightness around the object;

a zoom position sensor 30 for sensing the position of lenses;

a micro-controller 40 connected to the output terminals of the release switch S1, the photographic mode switch S2, the automatic distance measuring circuit 10, the brightness measuring circuit 20 and the zoom position sensor 30, and for controlling the emitting operation by changing the amount of light and a number of times the light is emitted according to the measured distance from the object and a zoom position when the red-eye phenomenon prevention photographic mode is set;

a flash 50 connected to an output terminal of the micro-controller 40 and for emitting a predetermined of amount of light according to an applied signal;

a lens driver 40 for moving the lenses to a corresponding zoom position; and a photographic part 70 for performing photographing by exposing an image of an object on a film.

Figure 4:
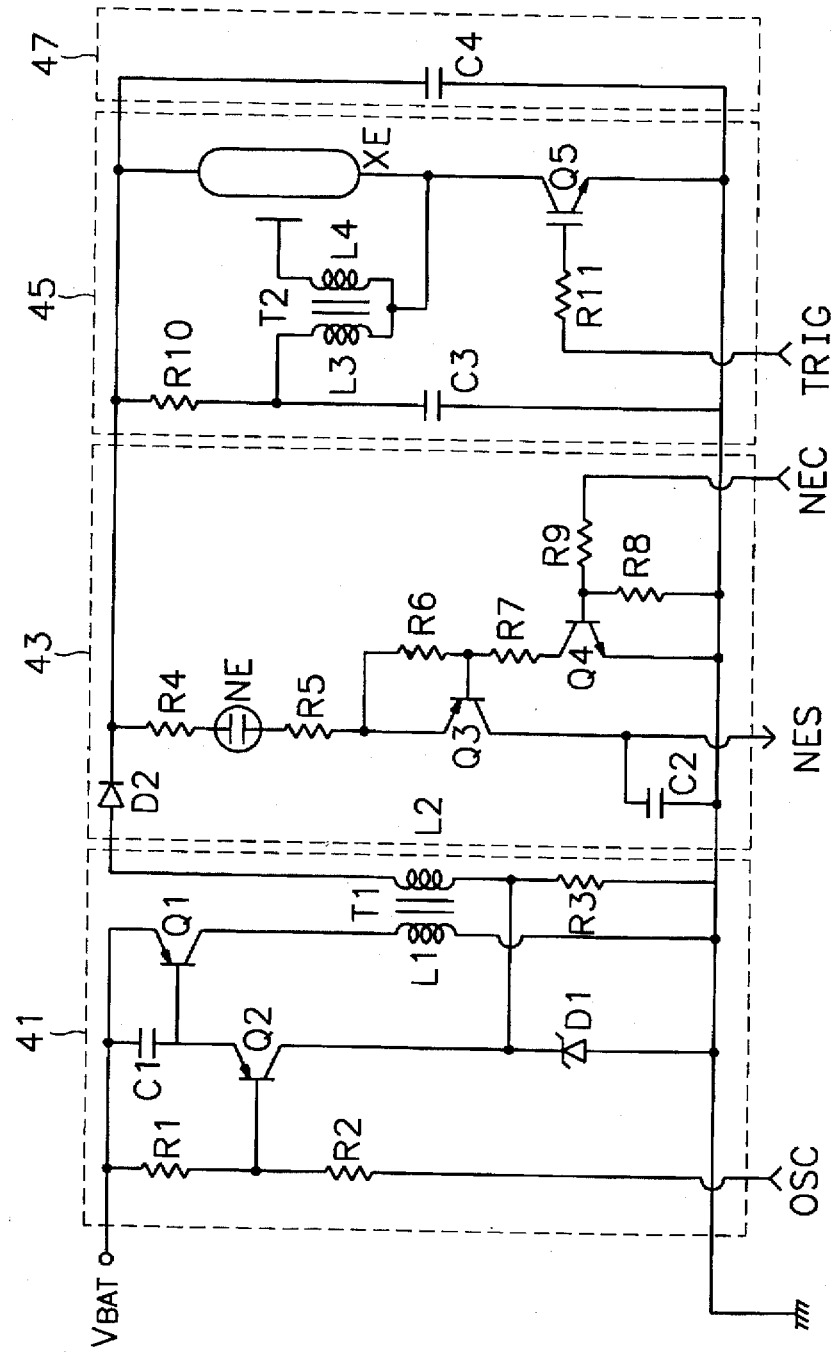
FIG. 4 is a detailed circuit diagram illustrating a flash in accordance with the preferred embodiment of the present invention.

Referring to FIG. 4, the flash includes:

a boosting part 41 for boosting DC voltage to the voltage of a predetermined level;

a charging part 47 connected to an output terminal of the boosting part 41 and for charging the applied voltage;

a charge amount sensor 43 for sensing the charge state of the charging part 47; and an emitting part 45 for emitting a predetermined amount of light according to the applied emitting signal.

The boosting part 41 includes:

a resistor R1 with one terminal connected to a power terminal;

a capacitor C1;

a resistor R2 with one terminal connected to the other terminal of the resistor R1 and the other terminal connected to a charge signal OSC terminal;

a transistor Q1 with an emitter terminal connected to the power terminal and a base terminal connected to the other terminal of the capacitor C1;

a transistor Q2 with an emitter terminal connected to the other terminal of the capacitor C1 and a base terminal connected to the other terminal of the resistor R1;

a diode D1 with an anode terminal connected to a collector terminal of the transistor Q2 and a cathode terminal connected to ground;

a transformer T1 with one terminal of one coil L1 connected to a collector terminal of the transistor Q1 and the other terminal connected to ground; and a resistor R3 with one terminal connected to one terminal of the other coil L2 of the transformer T1 and the other terminal connected to ground.

The charge amount sensor 43 includes:

a diode D2 with a cathode terminal connected to the other terminal of the other coil L2 of the transformer T1;

a resistor R4 with one terminal connected to an anode terminal of the diode D1;

a neon discharge tube NE with one terminal connected to the other terminal of the resistor R4;

a resistor R5 with one terminal connected to the other terminal of the neon discharge tube NE;

a transistor Q3 with an emitter terminal connected to the other terminal of the resistor R5 and a collector terminal connected to a charge state signal NES terminal;

a capacitor C2 with one terminal connected to a collector terminal of the transistor Q3 and the other terminal connected to ground;

a resistor R6 with one terminal connected to the other terminal of the resistor R5 and the other terminal connected to a base terminal of the transistor Q3;

a resistor R7 with one terminal connected to the other terminal of the resistor R6;

a transistor Q4 with a collector terminal connected to the other terminal of the resistor 7 and an emitter terminal connected to ground;

a resistor R8 with one terminal connected to a base terminal of the transistor Q4 and the other terminal connected to ground; and a resistor R9 with one terminal connected to a base terminal of the transistor Q4 and the other terminal connected to a charge finish check request signal NEC terminal.

The emitting part 45 includes:

a resistor R10 with one terminal connected to an anode terminal of the diode D2;

a capacitor C3 with one terminal connected to the other terminal of the resistor R10 and the other terminal connected to ground;

a xenon discharge tube XE with one terminal connected to the anode terminal of the diode D2;

a transformer T2 with one terminal of one coil L3 connected to the other terminal of the resistor R10, one terminal of the other coil L4 connected to the xenon discharge tube XE, and the other terminal of one coil L3 and the other terminal of the other coil L4 connected to the other terminal of the xenon discharge tube XE;

a resistor R11 with one terminal connected to an emitting signal TRIG terminal; and a transistor Q5 with a collector terminal connected to the other terminal of the xenon discharge tube XE, an emitter terminal connected to ground, and a base terminal connected to the other terminal of the resistor R11.

The operation of the camera flash control device for preventing red-eye phenomenon in accordance with the preferred embodiment of the present invention is explained as follows.

Figure 2:
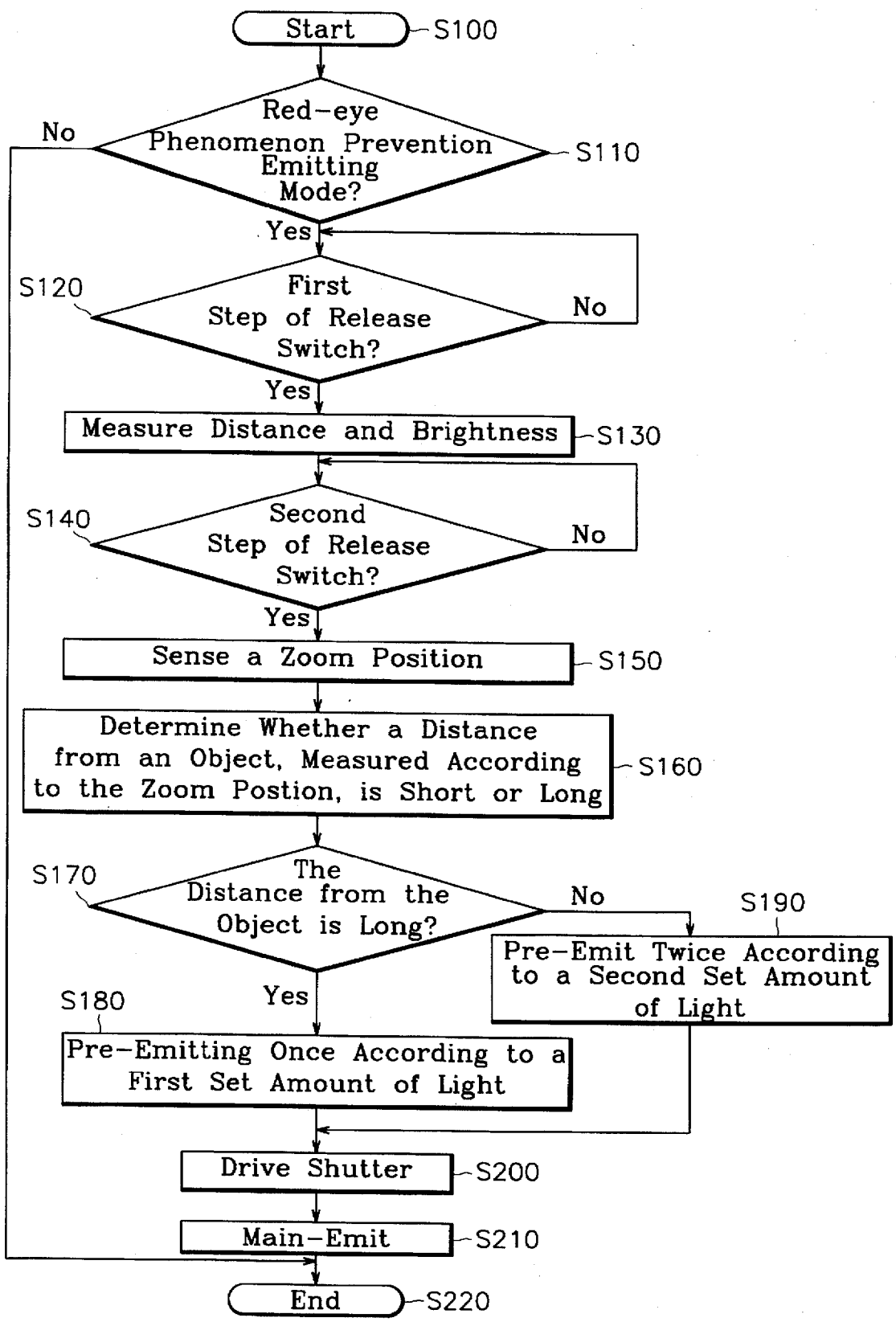
FIG. 2 is a flowchart illustrating the steps of the operational method for controlling a camera flash control device for preventing red-eye phenomenon in accordance with the preferred embodiment of the present invention.

Before performing a photographic operation, the micro-controller 40 determines whether the red-eye phenomenon prevention emitting mode is set, and performs the operation for preventing red-eye phenomenon according to a routine shown in FIG. 2 when the red-eye phenomenon prevention emitting mode is set. The micro-controller 40 does not perform the routine according to the preferred embodiment of the present invention when the red-eye phenomenon prevention emitting mode is not set.

The micro-controller 40 performs the corresponding photographic operation according to the operation of the release switch S1 when a user sets the red-eye phenomenon prevention emitting mode by operating the photographic mode switch S2.

When the first step of the release switch S1 is operated, the micro-controller 40 outputs a charge signal OSC of a low level to the flash 50 and performs a current charge operation for performing the emitting operation.

As the charge signal of a low level is applied, the transistor Q2 is turned ON, whereby the transistor Q1 is turned ON. The voltage, which is boosted to the voltage of a predetermined level, is rectified through the diode D2 and charged to the charging part 47.

After the charging operation is started, the micro-controller 40 measures the distance from the object according to a signal outputted from the automatic distance measuring circuit 10 and measures the ambient brightness around the object according to a signal outputted from the brightness measuring circuit 20 (Step 130).

The micro-controller 40 senses a zoom present position of the lenses according to a signal outputted from the zoom position sensor 30 when the second step of release switch S1 is operated, and determines whether the measured distance from the object is short or long according to the sensed zoom position (Steps 140 and 150).

That is to say, the micro-controller 40 determines that the distance from the object is long when the measured distance from the object is longer than a base distance, being variable according to the present zoom position of the lenses, and the distance from the object is short when the measured distance from the object is shorter than the base distance since each base distance, which is for determining whether the distance from the object measured according the present zoom position is short or long, is set differently from one another when the lenses move to the corresponding zoom position after the zooming operation is performed by a zoom switch (not shown) (Step 160).

The longer a focal length, that is, as the zoom position moves toward a telephoto position, the shorter the base distance according to the zoom position.

When the measured distance from the object is long, the micro-controller 40 outputs a flash driving signal once according to a first set amount and performs a pre-emitting operation.

That is, the size of the pupil of the object is reduced by performing the pre-emitting with a large amount of light once, and the main-emitting is performed since the size of the pupil of the object can not be reduced enough to prevent the red-eye phenomenon with a small amount of light when the distance from the object is long.

When the micro-controller 40 outputs the flash driving signal of a high level to the flash 50 to perform the emitting operation, the flash driving signal of a high level is applied to the base terminal of the transistor Q5 in the emitting part 45 and the transistor is turned ON, whereby a charge in the capacitor C4 is discharged through the first coil of the transformer T2.

A high voltage is induced into the second coil of the transformer T2 by the above discharging operation, the high voltage is applied to the xenon discharge tube XE, whereby the xenon in the xenon discharge tube XE is discharged and, at the same time, a predetermined amount of light is emitted.

Here, the voltage in the xenon discharge tube XE is lost, whereby the emitting operation is stopped since a current path is cut off when the transistor Q5 is turned OFF. Accordingly, the emitting time of the flash 50 depends on the time in which the transistor Q5 is turned ON.

Figure 3A:
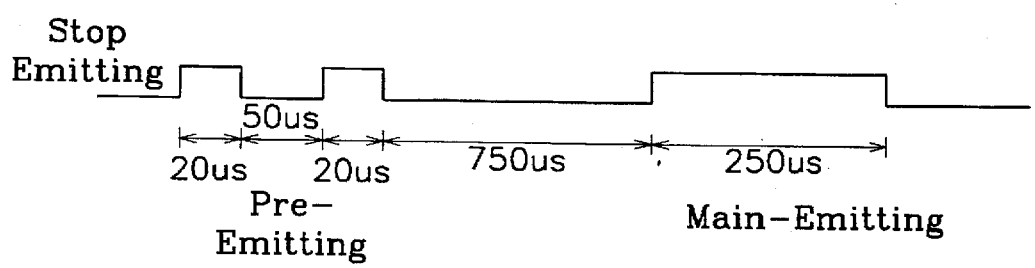
FIG. 3A is a timing chart illustrating the emitting operation of a flash when a distance from an object is short in the preferred embodiment of the present invention.
Figure 3B:
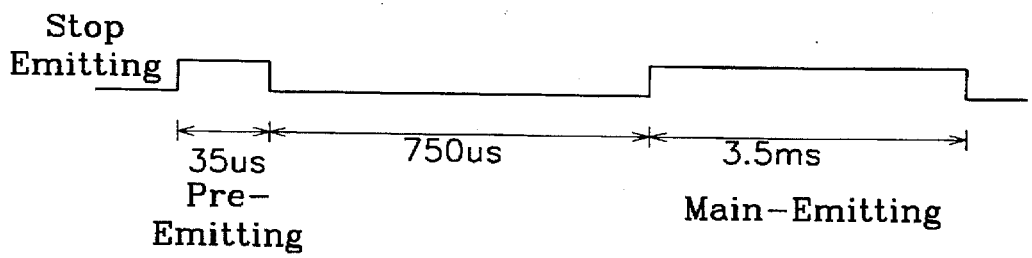
FIG. 3B is a timing chart illustrating the emitting operation of a flash when a distance from an object is long in the preferred embodiment of the present invention.

The micro-controller 40 outputs the flash driving signal according to the flash driving time, that is, the first set amount as illustrated in FIG. 3B, and reduces the size of the pupil of the object by driving the flash 50 once and emitting the predetermined amount of light (Steps 170 and 180).

Next, the micro-controller 40 drives the flash 50 while exposing the image of the object on a film by driving the photographic part 70 in order to obtain a photograph having suitable exposure amount, and performs the main-emitting for a time illustrated in FIG. 3B (Steps 200 and 210).

The micro-controller 40 performs the pre-emitting operation by outputting the flash driving signal twice according to the second set amount when the measured distance from the object is short.

That is, the micro-controller 40 reduces the size of the pupil of the object by performing the pre-emitting operation twice with the small amount of light, and performs the main-emitting operation since the size of the pupil of the object can be reduced with the small amount of light enough to prevent the red-eye phenomenon when the measured distance from the object is short.

Referring to FIG. 3A, the micro-controller 40 outputs the flash driving signal of a high level to the flash according to the flash driving time according to the second set amount, and reduces the size of the pupil of the object by emitting the predetermined amount of light twice (Step 190).

Since the first set amount in accordance with the preferred embodiment of the present invention is set larger than the second set amount, the larger amount of light is emitted at a time when the measured distance from the object is long, compared to the case when the measured distance from the object is short.

Table 1 shows the base distances according to the zoom positions according to the preferred embodiment of the present invention and the amount of pre-emitting thereof.

TABLE 1

| Focal distance | Base distance | GNo of main-emitting when distance is short |
| --- | --- | --- |
| 38 mm | 3.07 | 10 |
| 45 mm | 2.88 | 10.3 |
| 50 mm | 2.66 | 10.6 |
| 60 mm | 2.44 | 10.9 |
| 70 mm | 2.23 | 11.2 |
| 80 mm | 2.06 | 11.5 |
| 90 mm | 1.92 | 11.8 |
| 100 mm | 1.80 | 12.1 |
| 110 mm | 1.70 | 12.4 |
| 120 mm | 1.62 | 12.7 |
| 130 mm | 1.55 | 13.0 |
| 140 mm | 1.50 | 13.3 |

After performing the pre-emitting operation corresponding to the time when the measured distance from the object is long, the micro-controller 40 drives the flash 50 while exposing the image of the object on the film by driving the photographic part 70 in order to obtain the photograph having the suitable exposure amount, and performs the main-emitting for the time illustrated in FIG. 3A (Steps 200 and 210).

Here, the amount of light, in main-emitting when the measured distance from the object is short, is smaller than that in main-emitting when the measured distance from the object is long.

The amount of light and a number of times the light is emitted from the flash, are set differently from one another according to whether the measured distance from the object is short or long in the preferred embodiment of the present invention, but are not limited to this. That is, the measured distance from the object may be divided in more detail, and the amount of light and the number of times the light is emitted from the flash, can be set differently from one another according to the detailed divisions.

As described above, the preferred embodiment of the present invention can provide the camera flash control device and method thereof for preventing red-eye phenomenon which can prevent the red-eye phenomenon by controlling the amount of light and the number of times the light is emitted from the flash according to the distance measured from the object to the camera with a built-in flash.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A camera flash control device for preventing red-eye phenomenon, comprising:

first photographic mode selecting means for selecting a red-eye phenomenon prevention emitting mode;

automatic distance measuring means for measuring a distance from an object;

zoom position sensing means for sensing a present zoom position of lenses;

second photographic mode selecting means for selecting a red-eye phenomenon prevention photographic mode;

control means for controlling a pre-emitting operation by outputting a flash driving signal according to a first set amount when the distance from the object is long and outputting a flash driving signal according to a second set amount when the distance from the object is short after determining whether the distance from the object measured according to the present zoom position of the lenses is long or short when the red-eye phenomenon prevention photographic mode is selected; and emitting means driven according to the flash driving signal outputted from the control means and for emitting a predetermined amount of light.

2. The camera flash control device for preventing red-eye phenomenon of claim 1, wherein the control means determines that the distance from the object is long when the distance from the object is longer than a base distance, and determining that the distance from the object is short when the distance from the object is shorter than the base distance after reading the base distance according to the sensed zoom position of the lenses.

3. The camera flash control device for preventing red-eye phenomenon of claim 1, wherein the control means controls the pre-emitting operation by outputting the flash driving signal once according to the first set amount when the distance from the object is long and outputting the flash driving signal twice according to the second set amount when the distance from the object is short after determining whether the distance from the object measured according to the present zoom position of the lenses is long or short when the red-eye phenomenon prevention photographic mode is selected.

4. The camera flash control device for preventing red-eye phenomenon of claim 1, wherein the longer a focal distance according to the zoom position, the shorter the base distance for determining whether the measured distance from the object is long or short.

5. The camera flash control device for preventing red-eye phenomenon of claim 1, wherein a larger amount of light is emitted when the measured distance from the object is long, compared to the case when the measured distance from the object is short since the first set amount is set larger than the second set amount.

6. The camera flash control device for preventing red-eye phenomenon of claim 5, wherein the first set amount and the second set amount are proportionate to a flash driving time.

7. A method for preventing red-eye phenomenon, comprising the steps of:

sensing a present zoom position of lenses when a red-eye phenomenon prevention photographic mode is selected;

measuring a distance from an object and determining whether the measured distance from the object according to the sensed zoom position is long or short;

emitting a predetermined amount of light by driving an emitting means according to a first set amount when the measured distance from the object is long; and emitting a predetermined amount of light by driving the emitting means according to a second set amount when the measured distance from the object is short.

8. The method for preventing red-eye phenomenon of claim 7, wherein the determining step includes the steps for determining that the distance from the object is long when the distance from the object is longer than a base distance and, determining that the distance from the object is short when the distance from the object is shorter than the base distance after reading the base distance according to the sensed zoom position of the lenses.

9. The method for preventing red-eye phenomenon of claim 7, wherein the emitting step includes the steps for emitting the predetermined amount of light by driving the emitting means once according to the first set amount when the measured distance from the object is long, and emitting the predetermined amount of light by driving the emitting means according to the second set amount when the measured distance from the object is short.

10. The method for preventing red-eye phenomenon of claim 7, wherein the longer a focal distance according to the zoom position, the shorter the base distance for determining whether the measured distance from the object is long or short.

11. The method for preventing red-eye phenomenon of claim 5, wherein a larger amount of light is emitted when the measured distance from the object is long, compared to the case when the measured distance from the object is short since the first set amount is set larger than the second set amount.

12. The method for preventing red-eye phenomenon of claim 11, wherein the first set amount and the second set amount are proportionate to a flash driving time.

13. The camera control device for preventing redeye phenomenon of claim 2, wherein the base distances are set differently from one another at every zoom position since the base distances are changed according to the zoom operations.

14. A camera flash control device for preventing red-eye phenomenon, comprising:

first photographic mode selecting means for selecting a red-eye phenomenon prevention emitting mode;

automatic distance measuring means for measuring a distance from an object;

zoom position sensing means for sensing a present zoom position of lenses;

second photographic mode selecting means for selecting a red-eye phenomenon prevention photographic mode;

control means for dividing a distance from the object according to a zoom position of the lenses into a plurality of regions, setting the amount of light and a number of times the light is emitted differently from one another at every region, and outputting a flash driving signal according to the amount of light and a number of times the light is emitted in the region corresponding to the measured distance from the object according to the present zoom position when the red-eye phenomenon prevention photographic mode is selected; and emitting means driven according to the flash driving signal outputted from the control means and for emitting a predetermined amount of light.

15. The method for preventing red-eye phenomenon of claim 8, wherein the base distances are set differently from one another at every zoom position since the base distances are changed according to the zoom operations.

* * * * *